June 18, 1974   L. F. GRANTHAM   3,817,715
MUFFLER DEVICE
Filed Feb. 20, 1970

INVENTOR.
LEROY F. GRANTHAM
BY Henry Kolin
ATTORNEY

United States Patent Office 3,817,715
Patented June 18, 1974

---

3,817,715
MUFFLER DEVICE
Le Roy F. Grantham, Calabasas, Calif., assignor to Rockwell International Corporation
Continuation-in-part of abandoned application Ser. No. 684,239, Nov. 20, 1967. This application Feb. 20, 1970, Ser. No. 13,245
Int. Cl. B01j 9/04; F01n 3/04
U.S. Cl. 23—288 F                                11 Claims

ABSTRACT OF THE DISCLOSURE

A muffler unit, adapted for use with an internal combustion engine which contains an absorbent salt which is solid at room temperature and molten at the operating temperature of the internal combustion engine. The absorbent salt removes impurities present in the exhaust gas of the internal combustion engine when this gas is caused to come in contact with the absorbent salt. A preferred molten salt mixture contains alkali metal carbonates as the active absorbent.

CROSS REFERENCES TO RELATED APPLICATIONS

This application is a continuation-in-part divisional of application Ser. No. 684,239, filed Nov. 20, 1967, and since abandoned.

BACKGROUND OF THE INVENTION

This invention relates to a muffler device containing an absorbent salt for removing impurities from the exhaust gas of an internal combustion engine. It particularly relates to a device wherein the molten salt mixture therein contains alkali metal carbonates as the active absorbent particularly for nitrogen oxides and lead salts present in the exhaust gas.

Various impurities are found in the exhaust gas from internal combustion engines. The control of air pollution resulting from the discharge into the atmosphere of particular products found in automobile exhaust has become increasingly urgent. Automobile exhaust gases contain several undesirable substances which should preferably be removed prior to emission of the gas into the atmosphere. These include carbonaceous particulates, lead halides, sulfur oxides, nitrogen oxides, hydrocarbons, and carbon monoxide. Of the foregoing, perhaps the most serious as far as their contribution to the formation of photochemical smog and its ultimate effect on environmental deterioration are the nitrogen oxides, principally NO, which react with hydrocarbons present. Typical concentrations of nitrogen oxides $NO_x$, from automobile exhaust gases range from 100 to 4000 p.p.m. for a 4000-lb. automobile. The average concentration of $NO_x$ is approximately 1500 p.p.m. The initial reduction in the amount of $NO_x$ in the exhaust gas can be achieved by all or some of various automotive techniques which result in a lower ignition temperature, such as reduced compression ratio, exhaust recycle, water injection, spark timing control, lean carburetion, and frequent engine tuning. However, in order to obtain a significant reduction in nitrogen oxide emission by this method, i.e., greater than 50%, the performance of the engine is significantly reduced. Thus, external devices are required to reduce the $NO_x$ content while maintaining engine performance.

Heretofore, several catalysts have been investigated for utilization in mufflers to effect the chemical reduction of $NO_x$ with the CO also present to form $N_2$ and $CO_2$. Typical of such catalysts is copper oxide. However, all the systems utilizing such catalysts encounter various problems relating to catalyst volume and cost. Additionally, these catalysts have a short life span in that they eventually become poisoned by the sulfur dioxide, lead compounds, or carbonaceous materials present in the exhaust and no longer function as intended. Also, because of the high muffler temperatures encountered, such catalysts are subject to thermocyclic fracture thereof and consequent attrition. Many of the catalytic systems are limited in being specific to the minimizing of only a single impurity, e.g., $NO_x$. Additional catalysts may then be required to remove CO and some hydrocarbons. However, such catalysts will not remove significant amounts for any length of time of other impurities present in the gas phase, such as volatile lead halides, nor remove any solid particulate material from the exhaust.

SUMMARY OF THE INVENTION

It is an object of the present invention to provide a simple muffler device which can effectively remove substantial impurities from the exhaust gases produced by internal combustion engines. It is a particular object of the invention to provide a simple muffler device which can effectively remove nitrogen oxides from automobile exhaust gas. Additionally, and concurrent with the removal of the $NO_x$ impurities from automotive exhaust, the present invention will further remove solid particulate matter, including lead, lead halides, and carbonaceous particles. The device of the invention will also remove other impurities from the exhaust of internal combustion engines, including sulfur-containing materials and halogens.

In accordance with the invention, a muffler device is provided which comprises an enclosed housing having an inlet and outlet. The muffler device contains an absorbent salt, preferably a salt mixture containing alkali metal carbonates, such that exhaust gases passing from the inlet to the housing and therethrough to the outlet will contact the salt mixture. The salt mixture is solid at room temperature and molten at the operating temperatures of the internal combustion engine. A preferred molten salt mixture contains at least 50 wt. percent of the active absorbent consisting of a ternary mixture of the carbonates of lithium, sodium, and potassium. A particularly preferred molten salt mixture in the practice of the invention is a eutectic composition consisting of, in mole percent, 45±5 lithium carbonate, 30±5 sodium carbonate and 25±5 potassium carbonate which has a melting point of about 395° C.

In a first embodiment of the invention, the initially solid salt mixture is directly heated by passing the exhaust gases over the surface thereof within the muffler device. In a second embodiment of the invention, means are provided for directing the exhaust gas about the muffler to initially and externally heat the reservoir of salt to the melting temperature prior to directing the exhaust gas through the muffler. In an additional and preferred embodiment of the invention, the surface area of contact between the molten salt and the exhaust gas is increased by providing suitable contact means within the muffler, preferably in the form of a mesh of a corrosion-resistant material such as stainless steel or of an alumina packing, or the like. This contacting means is wetted by the molten salt at operating conditions. For this latter embodiment, while the salt on the mesh or packing is molten, the remaining portion contained in a reservoir need not necessarily be in the molten state. The mesh or packing in contact with the molten carbonate may also serve to promote the oxidation of NO to $NO_2$, $NO_2$ being absorbed more readily by the molten carbonate.

As indicated, the salt mixture used will remove $NO_x$ impurities from the exhaust gases. The carbon monoxide already present in the exhaust gas then acts as a reducing agent for the absorbed nitrogen compounds, converting them to elemental nitrogen and simultaneously acting as a regenerating agent for a molten alkali metal carbonate absorbent. In an additional embodiment of this invention, particularly where the amount of carbon monoxide present in the exhaust gas is at too low a level for reduction or regeneration, means are provided for feeding graphite or other suitable carbonaceous material to the molten salt mixture to act as a reducing agent for nitrates and nitrites and regenerate the molten carbonate salt.

The muffler may additionally contain an oxidation catalyst for oxidizing CO and unburned hydrocarbons $(CH_2)_x$. At the same time the catalyst can convert a large portion of NO to $NO_2$, which is more easily removed by the molten carbonate. Thus, it is another feature of this invention that an oxidation catalyst may be disposed in the inlet line to the muffler unit for oxidizing NO in the exhaust gas to $NO_2$ prior to gas contact with the molten carbonate. Alternatively, the oxidation catalyst may be disposed in contact with the molten carbonate.

DESCRIPTION OF THE PREFERRED EMBODIMENTS

Copending application Ser. No. 13,248, filed Feb. 20, 1970 discloses a process for removing impurities for exhaust gases, particularly nitrogen oxides, and lead halides; by contacing these gases with a molten salt mixture containing alkali metal carbonates as active absorbent.

The preferred ternary alkali metal carbonate system for use in the mufflers of this invention has been described by G. J. Janz and M. R. Lorenz in *J. Chem. Eng. Data 6, 321* (1961). As described therein, the alkali metal carbonate eutectic melts at 397±1° C. and consists of 43.5, 31.5 and 25.0 mole percent of the carbonates of lithium, sodium, and potassium, respectively. Since the low melting region around the eutectic temperature is quite broad, a relatively large variation in composition (±5 mole percent) does not change the melting point markedly. Thus, a suitable ternary eutectic composition range, in mole percent, consists of 45±5 lithium carbonate, 30±5 sodium carbonate, and 25±5 potassium carbonate.

The molten salt mixture may include other salts together with the alkali metal carbonates which serve to lower the melting point or even to enhance the absorption of nitrogen oxides. These salts are present in amounts up to 50 weight percent. For example, such molten salts may include alkali metal nitrates and nitrites, sulfites, sulfides, sulfates, oxides and chlorides.

Figure 1:
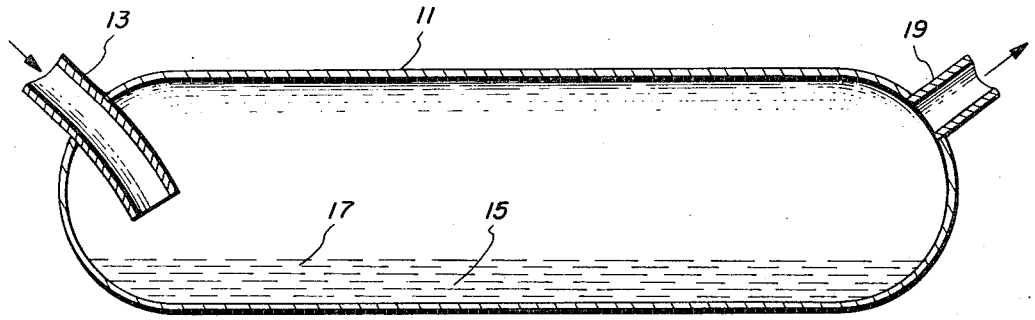
FIG. 1 discloses a cross-sectional view of a muffler for removal of impurities from exhaust gases.

Turning now to FIG. 1, there is seen a simple muffler design incorporating a preferred molten salt of this invention. The muffler is comprised of a suitable housing 11. Muffler housing 11 will preferably be comprised of relatively corrosion-resistant metal such as stainless steel or the like. Housing 11 can be made in varying designs or configurations suitable to be adapted to automobiles or other vehicles utilizing an internal combustion engine. The muffler housing 11 is provided with an inlet 13 through which exhaust gas can be admitted thereto. Within the muffler is a layer of the alkali metal carbonate eutectic salt mixture 15. It is preferred that the exhaust gas admitted through inlet 13 be directed downwardly toward the surface 17 of the salt, which is in a solid state at ambient non-operating temperatures since its melting point is about 395° C. Thus, when the engine is initially started, salt 15 will be in a solid state. The exhaust gas from the engine will strike the surface of the solid salt, warming it and eventually raising the temperature thereof to the melting point.

The reactions involved in removal of exhaust gas impurities, particularly of lead halides, occur relatively rapidly and thus the gas contact with a molten layer of the salt within the muffler will suffice to effectively remove these impurities. Additionally, the molten layer formed will serve to wet and entrain solid particulate matter from within the exhaust. The exhaust gases leave muffler 11 through a suitable exit or exhaust port 19.

The level of nitrogen oxides present in the exahust gas is very low at the initial starting and running conditions of an engine. Only small amounts of $NO_x$ may be formed when the engine is cold. Solid particulates require high flow rates to be forced out of the engine muffler. Not until the engine has reached operating temperatures do these impurities increase to a significant level. Thus, it is not too significant that salt 15 is solid initially and will not serve to immediately remove impurities. Also, the surface skin of layer 17 becomes molten very rapidly, which is sufficient for active absorption. For brief motor vehicle runs only a relatively thin layer of the salt becomes molten which sufficies to remove the impurities present. However, during longer duration operation of the vehicle, the entire body 15 of the salt becomes molten, thus adequately and sufficiently dispersing the impurities throughout the salt mixture.

When the impurity level has reached an undesirable level of about 50 to 80 wt. percent, which should occur in about 10,000 to 30,000 miles of operation, the molten salt can either be removed from the muffler unit or the muffler unit may be replaced. In the design for muffler 11 it is, of course, desirable that both inlet 13 and outlet 19 be located so that upon sloshing of the molten salt 15, neither of these lines will be effectively blocked by the molten salt or allow the salt to leave the muffler. Thus, the lines should be located sufficiently above the layer of salt 15 to allow for both movement of the vehicle up or down grades and sloshing of the salt when in the molten state.

Though the simple muffler device shown in FIG. 1 will suffice to remove impurities, the overall effectiveness of the muffler can be increased by providing for rapid melting of at least the surface of the eutectic salt mixture prior to passing the exhaust gas therethrough. Additionally, the effectiveness of the molten salt will be improved by dispersing it over a wide volume or area within the muffler to allow for greater surface area of contact between it and the exhaust gas. It is particularly desirable to be able to preheat the salt to a molten state prior to directing exhaust gases thereover.

In a preferred embodiment of the invention, the muffler unit will additionally have present therein a packing, such as of alumina, or a mesh of a corrosion-resistant material such as stainless steel, nickel-copper alloys, or the like, generally wettable by the molten salt, which further serve to increase the surface area of contact and thereby increase the reaction of the $NO_x$ with the molten carbonate, in accordance with the process disclosed in copending application Ser. No. 13,248 referred to above.

Figure 2:
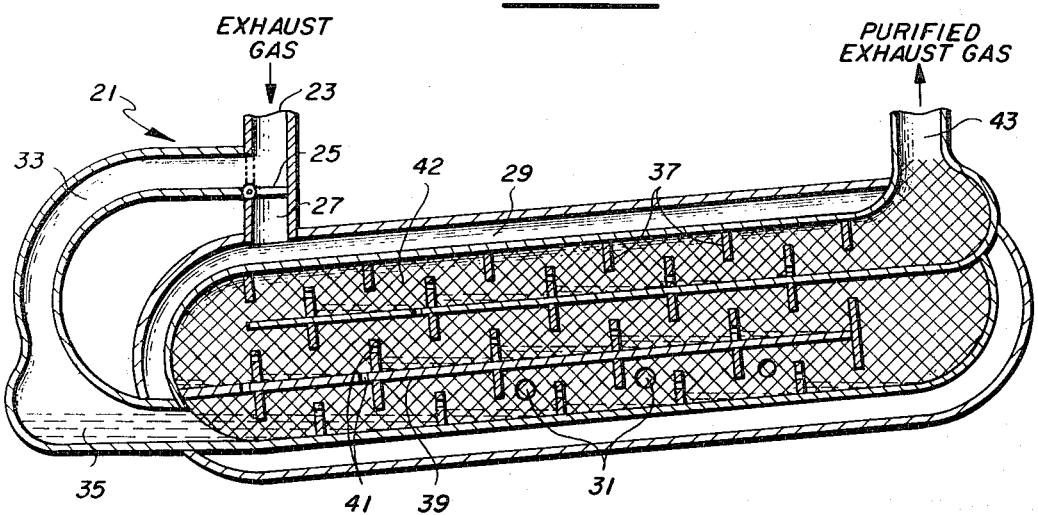
FIG. 2 is a cross-sectional view of a second embodiment of a muffler for removal of exhaust gase in accord with the herein invention.

Referring to FIG. 2, there is seen a muffler unit 21 wherein the exhaust gas in the manifold of an automobile engine is fed directly into an opening 23 thereof. When the automobile engine is first started the exhaust gas is cold and a thermostatically controlled valve 25 is initially in closed position (phantom view in FIG. 2). The cold exhaust gas is then directed through a passage 27 which feeds into an outer jacket 29 of the muffler, and then by way of a series of bypass openings 31 into the muffler. Thereby the exhaust gas, which is relatively free of nitrogen oxides in the cold state, bypasses the absorbent action of the main body of alkali metal carbonate contained in the muffler, and passes through the baffled passages of the muffler to the atmosphere. Since the ternary alkali metal carbonate eutectic has a melting temperature of about 395° C., the absorbent is in the solid state at room temperature. Bypass openings 31 still allow the initial exhaust gas to contact at least the upper surface of the solid salt present in the baffled passages thereby melting the salt in the upper levels of the muffler.

Under conditions of normal automobile operation, the exhaust gas may attain a temperature as high as 800° C. Therefore, upon operation of the engine and circulation of the exhaust gas in outer jacket 29, the absorbent contained in the muffler rapidly attains a molten state. At the same time, valve 25, which is suitably a thermostatically controlled butterfly valve, assumes an open position (solid line view) and the hot exhaust gas containing nitrogen oxides is diverted through passage 33 into a main body of molten absorbent 35. The muffler is suitably shaped to provide a desired pool of molten carbonate for contacting the hot exhaust gas. Since the muffler unit is also inclined from a horizontal position, the gas passing through the baffle passages of the muffler unit comes into gradually decreasing contact with the molten carbonate mixture, also retained against a series of fins 37 in the baffled passages. Thereby loss of molten carbonate from the muffler unit is minimized. The baffle plates 39 and fins 37 are provided with drain holes 41 for return of the absorbent to the main body of molten carbonate 35 and also to maintain a desired molten liquid level in each finned section of the muffler.

In the muffler unit there is preferably disposed on the upper surfaces of baffle plates 39 a packing or mesh 42 of stainless steel or other suitable material, as discussed in copending application Ser. No. 13,248. The mesh 42 is provided on the upper of baffle plates 39 so as to be wetted by the molten absorbent salt 35. The presence of packing 42 has been found to greatly aid the absorption of the nitrogen oxides and lead salts, improved results being obtained when this material is present. The packing may also serve as an oxidation catalyst to convert NO to $NO_2$, $NO_2$ being more readily absorbed by the molten carbonate. Packing 42 will ordinarily not be required if small amounts of nitrogen oxide or lead salt impurities are present in the exhaust gas. However, since $NO_x$ is one of the more deleterious impurities ordinarily present in exhaust gas, and since the packing has been shown to give improved results, it is thus preferred in the herein invention to incorporate the packing in the muffler design as shown in FIG. 2. Though a mesh form can be readily used in a muffler, various other forms of packing are contemplated such as metal wool and the like. The packing can be any material which can be wetted by the molten salt and will not deteriorate or react at the operating conditions of the muffler.

While theoretically the absorption and regeneration reactions are considered to proceed sequentially, effectively concurrent reactions are present, the mixed alkali metal carbonate serving as absorbent and the carbon monoxide contained in the exhaust gas serving as regenerant for the intermediately formed alkali metal nitrite and nitrate, in accordance with the following exemplary reactions:

$$4NO + M_2CO_3 \rightarrow MNO_3 + MNO_2 + CO_2 + N_2$$

$$MNO_3 + MNO_2 + 4CO \rightarrow M_2CO_3 + 3CO_2 + N_2$$

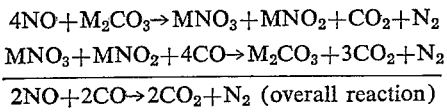

$2NO + 2CO \rightarrow 2CO_2 + N_2$ (overall reaction)

Thereby the exhaust emited from an exit passage 43 of muffler 21 is substantially free from the nitrogen oxides originally present. The foregoing absorption reaction and regeneration in the presence of CO will also occur in the muffler design of FIG. 1.

The overall reaction temperature for the absorption and regeneration reactions is maintained between 400 and 600° C. by either control of the temperature of the entering gas or of the molten carbonate, or by use of suitable heating or cooling means. A preferred reaction temperature is between 450° and 500° C. Where it is desired to have the absorbent initially available in the molten state, various heaters (not shown), such as Calrod electric heaters, may be incorporated in the muffler wall.

The three major pollutants present in automobile exhaust are carbon monoxide, unburned hydrocarbons and nitrogen oxides. Various engine modifications have been undertaken to limit the CO and unburned hydrocarbon content in the exhaust to a level of about 1.5% and 275 p.p.m., respectively. This is accomplished by various techniques such as providing a modified carburation system utilizing a relatively lean fuel-oxygen mixture, and thus achieving more complete combustion. Further, modifications to spark plugs have been made to assure more complete conversion of CO to $CO_2$ and oxidation of the hydrocarbons. However, there presently exist no suitable practical devices that will significantly lower the $NO_x$ impurity content of automotive exhaust gases without impairing automotive performance.

The molten carbonate used in the muffler device disclosed herein will remove a substantial fraction of the remaining $NO_x$ in the exhaust. Further, in order to regenerate the carbonate from the nitrite and nitrate which are formed by NO absorption in the melt, the presence of CO is required in the exhaust. Should current efforts to reduce the CO content in the exhaust to low levels succeed sufficient CO may not be present in the gas, or the reaction with CO may not be rapid enough, to regenerate the carbonate. For use with exhaust gases containing low CO levels, the muffler device of the herein invention can be further modified to remove the remaining CO and unburned hydrocarbons, $CH_{2(x)}$, in a device in which excess oxygen is present in the exhaust gas while concurrently providing means for regenerating the carbonate melt.

Figure 3:
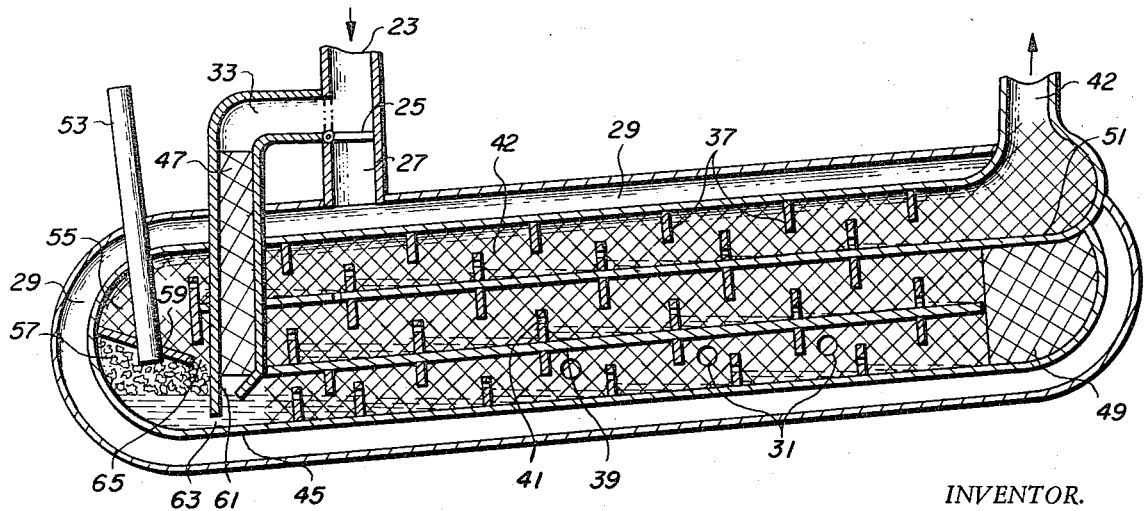
FIG. 3 is a cross-sectional view of a third embodiment of a muffler for the removal of impurities from exhaust gases.

Referring to FIG. 3, an embodiment is shown of essentially the muffler device shown in FIG. 2 modified to provide means for regenerating the carbonate melt and removing remaining CO and $(CH_2)_x$ from the exhaust gas. In this embodiment, passage 33 from inlet or opening 23 is directed downwardly as an enclosed tube opening adjacent the bottom-most surface or baffle plate 45 of the device. As a result, when the valve 25 is in the position shown in the drawing such that the exhaust gas will be diverted directly into the muffler, the exhaust gas will be directed through the uppermost baffle plates and be emitted adjacent the molten salt layer on the bottom surface 45. Disposed within conduit 33 is an oxidation catalyst 47 which can serve to oxidize NO present in the exhaust to $NO_2$, $NO_2$ being more readily absorbed by molten carbonate. Any standard oxidation catalyst can be utilized, such as vanadium oxide or the like. Further, the additional portion 49 of the same catalyst can be packed within the muffler between the bottom surface 45 and an intermediate baffle plate 51, so positioned that the gas flowing through the muffler device will be diverted through this additional catalytic material 49, completing the oxidation of the CO and $(CH_2)_x$. It should be pointed out that though the catalytic material is shown disposed both in the inlet line and within the muffler, it can be dissolved within the melt solution depending upon the catalyst used. For example, the vanadium oxide could be used as a melt solute and thus would not have to appear in a fixed position in the muffler device.

It should be pointed out that the necessity for an oxidation catalyst such as shown in this embodiment will depend upon the level of CO and unburned hydrocarbons present in the exhaust gas, as well as NO. Should the level of CO and hydrocarbons be reduced to a point where virtually neither of these impurities are present in the exhaust gas, then obviously the oxidation catalyst will not be required except for possible promotion of NO oxidation. In any event, whether the CO level in the exhaust gas is reduced prior to the gas being fed to the muffler of this invention, or is reduced in the muffler by use of an oxidation catalyst, there will not then generally be enough CO present, or reaction conditions may not be suitable to regenerate the carbonate salt from the nitrite and nitrate formed in accord with the above reactions. For such an event, an additional source of carbon is provided to reduce formed nitrite and nitrates to nitrogen. For example, carbon will react with the nitrite and nitrates in accordance with the following exemplary equations to produce carbon dioxide and elemental nitrogen while thereby regenerating the mixed alkali metal carbonates (M=K, Li, Na):

$$3/2C + 2MNO_2 \rightarrow M_2CO_3 + 1/2CO_2 + N_2$$

$$5/2C + 2MNO_3 \rightarrow M_2CO_3 + 3/2CO_2 + N_2$$

Where carbon is added to the carbonate to regenerate the salt in accordance with the above reactions, graphite or other suitable carbonaceous material such as various hydrocarbons, asphalts, activated carbon, charcoal and the like can be directly added to the muffler and fed into the molten carbonate present. Also, as seen in FIG. 3, a fill tube 53 is provided which extends from without the muffler, intersecting the walls thereof, and terminates in the main muffler body at a forward end 55 of the muffler (closest to the engine). The carbonaceous material can thus be fed through the line 53 into a reservoir area 57 at the inlet end 55 of the muffler. Reservoir area 57 is formed by a top surface 59 and a barrier 65 extending from the inlet conduit 33. The carbonaceous material is contained in the reservoir area 57 and floats near the surface of the molten carbonate therein. The molten carbonate will be caused to circulate by the entering exhaust gas from the reservoir through the baffles returning to the reservoir through an opening 65 in top surface 57. An opening 63 allows the molten carbonate to circulate from the carbonaceous material in the reservoir in response to the action of the exhaust gas. The foregoing arrangement minimizes contacting of the coke by the waste gas, which may contain oxygen which would react with the carbon.

It will of course be understood that various modifications can be made in the design and operation of the present invention without departing from the spirit thereof. Thus, while the principle, preferred construction, and mode of operation of the invention have been explained and what is now considered to represent its best embodiment has been illustrated and described, it should be understood that within the scope of the appended claims the invention may be practiced otherwise than as specifically illustrated and described.

I claim:

1. A muffler device for treating an impurity-containing exhaust gas of an internal combustion engine to remove impurities therefrom comprising, in combination:

an enclosed, elongated housing having means adapted for connection in the exhaust system of the engine and means including a sump region adapted for retaining a pool of absorbent molten salt in said housing during treatment of said exhaust gas, said sump region providing an exhaust gas-molten absorbent contact area in the bottom of said housing and containing a body of an absorbent salt which is solid at room temperature and which forms a molten pool for absorbing and reacting with said impurities upon increasing the temperature of said body above its melting point, said body of absorbent salt containing at least 50 percent of the active absorbent which consists of a ternary mixture of the carbonates of lithium, sodium, and potassium, said molten pool being maintained at least by thermal energy transfer from the exhaust gas including contact of hot exhaust gas from said engine upon the surface of said body and being retained in said housing during treatment of said exhaust gas, an inlet line disposed in said housing and including an inlet port at one end of said line adapted to receive the impurity-containing exhaust gas from an exhaust manifold of said engine, said line further including downwardly disposed impinging means at other end of said line cooperatively positioned adjacent said body of absorbent salt for directly impinging said exhaust gas on the surface of said body of absorbent salt, an exit port disposed in said housing and positioned downstream from said inlet port and downstream from and above said sump region for discharging the purified exhaust gas stream from the housing, and gas-flow-directing baffle means disposed within said housing downstream from said sump region to form a baffled gas passageway between said inlet and exit ports and adapted so that during operation liquid particles of said molten absorbent displaced and entrained by contact of said pool by the exhaust gas stream wet the surfaces of said baffle means so that said surfaces provide a plurality of molten salt pools serving as further exhaust gas-molten absorbent contact areas and provide for return of said molten absorbent to the sump region prior to discharge of the exhaust gas from the housing through the exit port.

2. The muffler device of claim 1 wherein said active absorbent is a eutectic composition molten above 395° C. and consisting essentially of, in mole percent, 45±5 lithium carbonate 30±5 sodium carbonate, and 25±5 potassium carbonate.

3. The muffler device of claim 1 wherein said baffle means includes an array of substantially horizontally and vertically extending fins and plates having aperture-defining means in the surfaces thereof, and a packing is disposed in said housing between the inlet and outlet ports and in at least a major portion of said baffled gas passageway so that during operation said packing is wetted by liquid particles of the molten absorbent entrained in the exhaust gas stream to provide a plurality of additional exhaust gas-molten absorbent contact areas and to provide additional separation of the entrained liquid particles from said exhaust gas stream for return to said sump region by way of said aperture-defining means.

4. The muffler device of claim 3 wherein said packing comprises:

a wire mesh which is substantially non-reactive with the molten salt at the operating temperatures of the muffler.

5. The muffler device of claim 1 additionally comprising:

means associated with said housing for initially increasing the temperature of said body of absorbent salt to bring it to a molten state prior to directing the exhaust gas through said impinging means in contact therewith.

6. The muffler device of claim 5 wherein said means for initially increasing the temperature of said body of absorbent salt to bring it to a molten state includes a jacketed heat-exchanging annular passageway surrounding said enclosed housing, gas by-pass means for passing said exhaust gas from said inlet port through said heat-exchanging passageway without passing through said enclosed housing, and temperature-responsive means in said inlet port for directing at least a major portion of said exhaust gas stream into said annular passageway at temperatures below the melting point of the body of absorbent salt and into said enclosed housing at temperatures above said melting point so as to impinge on the body of molten salt.

7. The device of claim 1 additionally comprising:

a body of a carbonaceous material disposed in said housing in contact with said body of absorbent salt in said sump region so that during operation said carbonaceous material in contact with the molten absorbent salt serves to lower substantially the content of nitrogen-containing compounds present in said molten salt and formed by reaction in said sump region of said molten salt with nitrogen oxides initially present in the hot exhaust gas.

8. The device of claim 7 wherein said body of absorbent salt contains at least 50 weight percent of an active absorbent which is a eutectic composition consisting essentially of, in mole percent, 45±5 lithium carbonate, 30±5 sodium carbonate, and 25±5 potassium carbonate.

9. The device of claim 7 further comprising:
a separate fill line disposed in and intersecting the walls of said housing, said fill line including an inlet at one end of said line adapted to receive said carbonaceous material and an outlet at the other end of said line cooperatively positioned adjacent said body of absorbent salt in said sump region for selectively adding said body of carbonaceous material to said body of absorbent salt.

10. The device of claim 1 wherein a bottom surface of said housing is inclined from the horizontal so as to form in the sump region during operation a molten pool of said absorbent salt of decreasing depth in a downstream direction from said inlet port.

11. The device of claim 10 further including means defining apertures in said baffle means for return of molten absorbent salt to said molten pool.

References Cited
UNITED STATES PATENTS

| | | | |
|---|---|---|---|
| 3,563,029 | 2/1971 | Lowes | 60—30 |
| 2,991,160 | 7/1961 | Claussen | 23—288.3 F |
| 3,438,722 | 4/1969 | Heredy et al. | 23—2 |

OTHER REFERENCES

A.P.C. publication of abandoned application of Beck et al., Ser. No. 393,258, published July 13, 1943.

JAMES H. TAYMAN, Jr., Primary Examiner

U.S. Cl. X.R.

23—284,285; 196—118; 423—210.5

UNITED STATES PATENT OFFICE
CERTIFICATE OF CORRECTION

Patent No. 3,817,715      Dated June 18, 1974

Inventor(s) LeRoy F. Grantham

It is certified that error appears in the above-identified patent and that said Letters Patent are hereby corrected as shown below:

Column 3, line 25, "gase" should read --gases--;
          line 34, "for" second occurrence should read --from--;
          line 68, "eutetic" should read --eutectic--;
          line 75, "warming, it" should read --warming it,--.

Column 4, line 11, "exahust" should read --exhaust--;
          line 15, after "engine" insert --and--;
          line 32, "for" should read --of--;
          line 46, "wide" should read --wider--.

Column 5, line 31, after "upper" insert --surface--;
          line 64, "emited" should read --emitted--.

Column 7, line 25, "65" should read --61--;
          line 64, after "50" insert --weight--.

Column 8, line 1, after "at" insert --the--;
          line 26, after "lithium carbonate" insert --,--.

Signed and sealed this 14th day of January 1975.

(SEAL)
Attest:

McCOY M. GIBSON JR.
Attesting Officer

C. MARSHALL DANN
Commissioner of Patents